Patented May 22, 1951

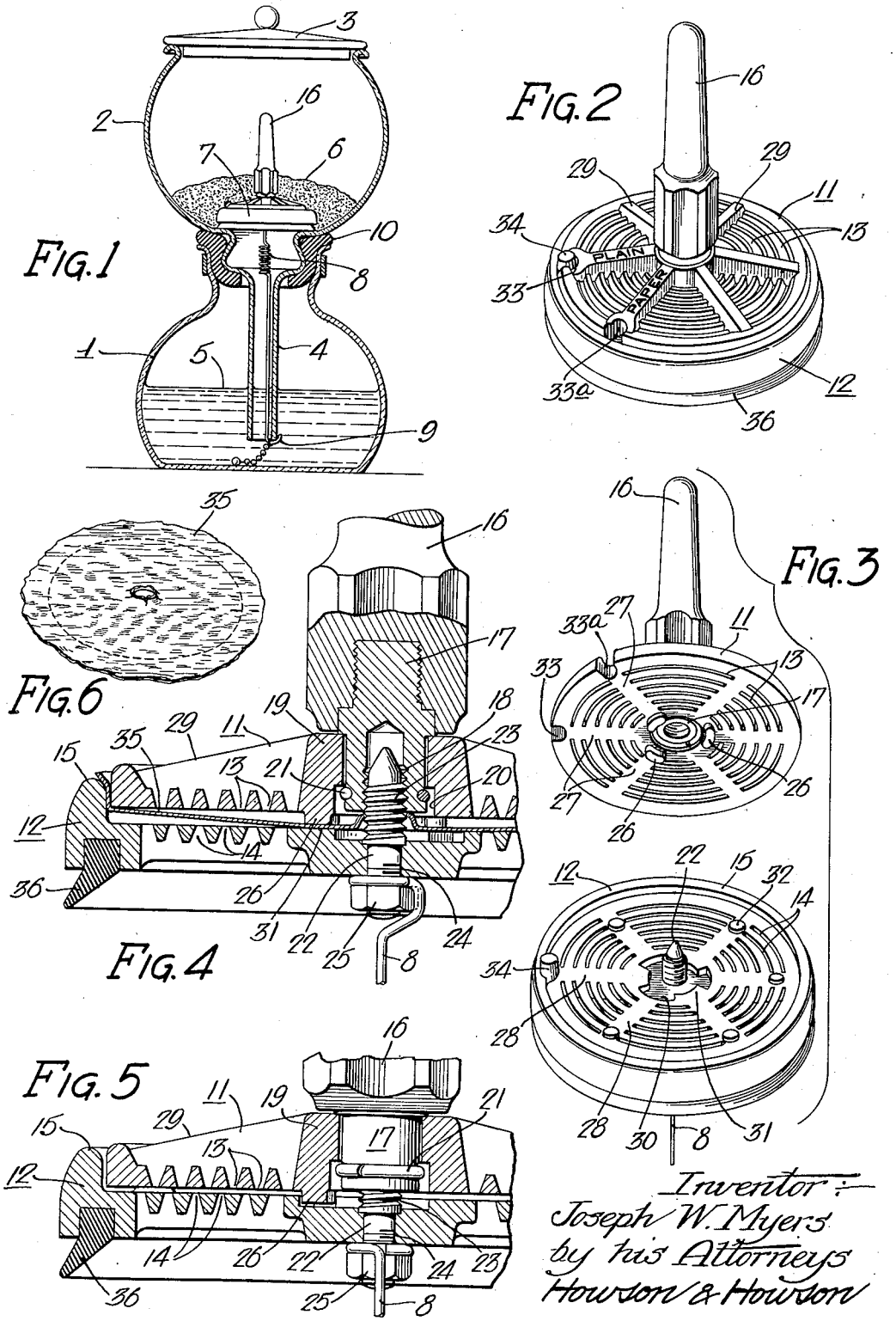

2,553,717

UNITED STATES PATENT OFFICE 2,553,717

COFFEE FILTER

Joseph W. Myers, Philadelphia, Pa., assignor to Proctor Electric Company, Philadelphia, Pa., a corporation of Pennsylvania Application July 18, 1946, Serial No. 684,457

1 Claim. (Cl. 210—162)

This invention relates to coffee filters and more particularly to a novel filter which is adapted for use in the well-known vacuum type coffee maker.

The present invention is in the nature of a further embodiment or modification of the invention disclosed and claimed in my prior application, Serial No. 610,238, filed August 11, 1945, now Patent No. 2,472,955. In that application, there is disclosed and claimed a coffee filter comprising a pair of disk-like members having provision for removable attachment to one another, said members having misaligned openings so as to provide filter passages between said members, and means for varying the spacing of said members so as to vary the filtering speed and the clarity of the coffee beverage. Such device is highly desirable and advantageous, as set forth in the said prior application, and it meets all of the normal requirements as to clarity of the filtered beverage. However, some persons desire a crystal-clear beverage such as can be obtained only by filtering through a filter sheet or the like.

The principal object of the present invention is to provide a filter of the above-mentioned type, wherein provision is made for filtering through a filter sheet, whenever desired, so as to give a crystal-clear beverage.

Another object of the invention is to provide a filter of the above-mentioned type, which is adapted to be used alone and which gives a very satisfactory degree of clarity of the beverage when thus used, and which is also adapted to employ a filter sheet whenever the user desires an extreme degree of clarity of the beverage.

A further object of the invention is to provide a novel filter device which is easy to keep clean and does not deteriorate with age, and which is adapted to employ a sheet of material that may serve as a filter whenever the user desires a crystal-clear beverage.

Other objects and features of the invention will be apparent as the description proceeds.

In the accompanying drawing,

Fig. 1 is a small scale view, partly in section and partly in elevation, of a vacuum type coffee maker with the novel filter of the present invention disposed therein;

Fig. 2 is a perspective view of the coffee filter;

Fig. 3 is an exploded view showing the detachable parts or members of the filter in perspective;

Fig. 4 is a fragmentary sectional view, on a relatively large scale, showing the filter members positioned for use with a filter sheet, and showing such sheet in place;

Fig. 5 is a similar view of the device, showing the parts positioned for use without the filter sheet; and Fig. 6 is a perspective view showing the filter sheet removed from the device.

Referring first to Fig. 1, the vacuum type coffee maker shown comprises the usual water heating vessel 1 and the coffee infusion vessel 2 with its lid 3. The vessel 2 has the usual tubular portion 4 extending downward into the vessel 1 and adapted to conduct liquid between the two vessels. In operation of this type of coffee maker, the water 5 in vessel 1 is heated and rises upward in the tube 4 into vessel 2 where it comes in contact with the ground coffee 6, the resulting infusion of the heated water and the ground coffee producing the coffee beverage. When substantially all of the heated water has risen into vessel 2, the applied heat is cut off, and the vacuum created within the vessel 1 draws the coffee beverage downward into vessel 1. It is necessary, of course, to provide a filter device to prevent the ground coffee from passing downward into the vessel 1, and the present invention provides a novel filter device designated generally by reference character 7. The filter device is adapted to seat in the lower part of vessel 2, and it may be held securely therein by means of a spring member 8, one end of which is extended and is adapted to hook over the bottom of the tubular portion 4, as shown at 9. A sealing member 10 is provided between the upper part of the vessel 1 and the lower part of vessel 2, as is customary in this type of coffee maker.

Referring now to the other figures of the drawing, the filter device provided by the present invention comprises a pair of members 11 and 12 which are generally of disk-like form and which are provided with arcuate openings 13 and 14 of narrow width. Member 12 has a peripheral rim 15 formed thereon, within which member 11 is adapted to seat when the two members are attached together, as shown in Figs. 4 and 5. The openings 13 and 14 are offset radially so as to provide filter passages between the faces of said members when they are closely disposed. Preferably the openings are tapered as illustrated.

Preferably the members 11 and 12 are formed of non-metallic material, such as Bakelite, and a handle 16 of similar material is secured to the member 12 in the manner shown in Figs. 4 and 5. In the lower part of the handle 16, there is provided a metal insert 17 which is recessed and threaded at 18, and which projects through the central hub portion 19 of member 11. The latter is recessed at 20, and a split ring 21 serves to maintain the parts together. The handle 16 is thus rotatably mounted on member 11, the metal insert 17 being rotatable within the hub portion 19. The purpose of this structure will be apparent presently.

Member 12 is provided with a centrally-located fixed metal stud 22, which extends through the central part of said member, as shown in Figs. 4 and 5. The stud 22 is insertable in the metal insert 17, and is threaded at 23, so as to engage the threaded portion 18 of the insert 17. The stud 22 is also threaded at 24 to receive a nut 25. The spring member 8, hereinbefore mentioned, has one end secured to the bottom of member 12 by means of the threaded stud 22 and nut 25, as shown in Figs. 4 and 5. The faces of members 11 and 12, which are adapted to be brought into close adjacency to one another, are flat except for the projections and recesses now to be described.

As clearly shown in Fig. 3, member 11 is provided with a plurality of projections 26, which are located near the center of the said member adjacent the open end of insert 17 into which the stud 22 is adapted to extend. Preferably, the members 11 and 12 are divided into six equal sectors which are occupied by the arcuate apertures 13 and 14. Thus member 11 is divided into six sectors by the radial portions 27, while member 12 is similarly divided by radial portions 28. On the outer faces of the two members there are provided radial reinforcing ribs such as shown at 29 in Fig. 2. As shown in Fig. 3, there are three of the projections 26 on member 11, which are substantially aligned with alternate ones of the radial portions 27.

Member 12 is centrally recessed and has three recesses 30 separated by radial extensions 31 of the flat face of said member. The recesses 30 are substantially aligned with alternate ones of the radial portions 28, while the extensions 31 are substantially aligned with the other alternate portions 28. The recesses 30 are complementary to the projections 26 on member 11, and are adapted to receive said projections when the two members are relatively positioned in a certain manner.

Member 12 is also provided with outwardly located projections 32 which are adapted to establish a close spacing of the two members when the projections 26 are seated in recesses 30.

When projections 26 are not thus seated but engage the radial extensions 31, the said projections establish a relatively wide spacing of the two members due to the fact that said projections are of greater height or depth than projections 32.

In order to effect the different spacings of the two members, provision is made for indexing the members in different relative positions. To this end, member 11 is provided with two recesses 33 and 33a which are located at the outer ends of two adjacent radial portions 27, while member 12 is provided with projection 34 which is located at the outer end of one of the radial portions 28 and is adapted to seat in either of the recesses 33 and 33a. When the two members are so relatively positioned that projection 34 is seated in recess 33, as shown in Fig. 2, the projections 26 seat in recesses 30, and the projections 32 are effective to establish a relatively close spacing of the two members. This is the condition for use of the filter device without a filter sheet, as hereinbefore mentioned, and it gives rapid filtering, with all grinds and roasts of coffee, through the small passages formed by the radially staggered apertures 13 and 14, as shown in Fig. 5. To this end, the projections 32 may be several thousandths of an inch in depth. While such use of the filter device gives a satisfactory degree of clarity of the coffee beverage for most users, it does not give a crystal-clear beverage which some persons demand even at the expense of slow filtering action.

When the members 11 and 12 are so relatively positioned that projection 34 seats in recess 33a, the projections 26 engage the radial extensions 31 and establish a relatively wide spacing of the two members, as shown in Fig. 4. This is the condition for use of a filter sheet which is shown at 35 in Fig. 4.

The two conditions above described are designated by the words "plain" and "paper" applied to ribs of member 11 opposite the recesses 33 and 33a, as may be seen in Fig. 2. These designations indicate to the user the proper positioning of member 11 relative to member 12 for each condition.

In using the filter device without the filter sheet, the members 11 and 12 are brought into proper relation, with projection 34 seated in recess 33 and with the stud 22 extending into the insert 17. The handle 16 is then turned to rotate insert 17 and thus secure the members together as shown in Fig. 5. The filtering device is then placed within the upper vessel of the coffee maker, as shown in Fig. 1, member 12 being provided with a sealing ring 36 (see Figs. 4 and 5), formed of rubber or the like, so as to effect a good seal with the vessel 2. During the operation of the coffee maker, the filter device permits the water to rise into the upper vessel and it permits the coffee beverage to pass downward into the lower vessel.

When it is desired to use the device with a filter sheet, the sheet is first placed over the lower member 12 with the stud 22 projecting through the sheet. It will be noted that the upper end of stud 22 is tapered or pointed so as to readily pierce the filter sheet. One advantage of the device is that any piece of paper which is capable of serving as a filter sheet may be used. For example, an ordinary paper towel or paper napkin may be employed. After the sheet has been placed over member 12, member 11 is placed above the filter sheet, with recess 33a positioned to receive projection 34. The two members are then secured together by rotating the handle 16, after which the excess portion of the filter sheet may be torn away. As shown in Fig. 4, the filter sheet 35 is securely held at its central portion by the projections 26 on member 11 and the cooperating radial extensions 31 on member 12. At its peripheral portion, the sheet is gripped by the peripheral portion of member 11 and the rim 15 of member 12. Fig. 6 shows the filter sheet removed from the filter device.

With the device thus conditioned for fine filtering of the coffee beverage by means of the filter sheet, the faces of members 11 and 12 are spaced sufficiently far apart to permit free flow of the beverage to the upper surface of the filter sheet. During the coffee making operation, the water passes upward through the filter sheet, and the coffee beverage passes downward therethrough after the infusion has taken place. After the coffee making operation has been completed, the members 11 and 12 are separated and the filter sheet is removed and discarded.

Whether the device is used with or without the filter sheet, the parts of the device may be readily cleaned by detaching them and by allowing water to run through the apertures and over the faces of each part. Moreover, the device is durable and does not require periodic replacement.

While a preferred form of the filter device has been illustrated and described, it will be apparent that the device may be variously modified, particularly as to structural details. It is to be understood, therefore, that the invention is not limited to the specific form shown, but is commensurate in scope with the appended claim.

I claim:

A coffee filter adapted for use with or without a filter sheet, comprising a pair of circular disklike members removably attached together at their centers, said members being relatively rotatable about their centers and having confronting faces, said members being similarly divided radially into a plurality of equal sectors each having arcuate apertures therein, the apertures of one member being radially offset with respect to those of the other member, indexing means on said members for fixing said members in either of two different angular positions, outwardly disposed projections on the radial dividing portions of one member engageable with the radial dividing portions of the other member when the members are in one of said relative positions to establish a very close spacing of the confronting faces of said members, whereby to provide a substantial number of small filter passages between the mutually adjacent solid areas of the respective confronting faces, and centrally located mutually cooperative projections and recesses on said members inoperative when the members are in said one relative position but operative when the members are in the other relative position to establish a relatively wide spacing of said faces sufficient to accommodate a filter sheet between said faces and to permit free flow of the coffee beverage to the filter sheet, one of said members having a peripheral rim within which the other member seats and which serves to clamp the filter sheet, said sheet being held at its central portion by the last-mentioned projections.

JOSEPH W. MYERS.

REFERENCES CITED

The following references are of record in the file of this patent:

UNITED STATES PATENTS

| Number | Name | Date |
|---|---|---|
| 158,120 | Porter | Dec. 22, 1874 |
| 1,201,268 | Davis | Oct. 17, 1916 |
| 1,703,266 | Dowling | Feb. 26, 1929 |
| 1,885,850 | Marter | Nov. 1, 1932 |
| 2,069,939 | Browning | Feb. 9, 1937 |
| 2,240,721 | Selitzky | May 6, 1941 |
| 2,472,955 | Myers | June 14, 1949 |

FOREIGN PATENTS

| Number | Country | Date |
|---|---|---|
| 9,643 | Great Britain | 1914 |
| 295,812 | Great Britain | 1928 |